United States Patent [19]
Tsuji

[11] Patent Number: 5,442,420
[45] Date of Patent: Aug. 15, 1995

[54] EXPOSURE DEVICE

[75] Inventor: Masaaki Tsuji, Wakayama, Japan

[73] Assignee: Noritsu Koki Co., Ltd., Wakayama, Japan

[21] Appl. No.: 255,916

[22] Filed: Jun. 7, 1994

[30] Foreign Application Priority Data

Jun. 8, 1993 [JP] Japan .................. 5-137155

[51] Int. Cl.⁶ ............................................. G03G 15/00
[52] U.S. Cl. ............................................. 355/74; 226/170
[58] Field of Search ................. 355/73, 74; 242/75.1, 242/182

[56] References Cited

U.S. PATENT DOCUMENTS

| 3,698,706 | 10/1972 | Mihojevich et al. ........... 271/9 |
| 4,754,308 | 6/1988 | Ozawa ........................... 355/74 |
| 4,881,711 | 11/1989 | Vollaro .......................... 355/73 |
| 4,886,352 | 12/1989 | Ozawa et al. .................. 355/74 |
| 5,311,247 | 5/1994 | Hatori et al. .................. 355/43 |

FOREIGN PATENT DOCUMENTS 0152548  8/1985  European Pat. Off. .
1358337  7/1974  United Kingdom .

Primary Examiner—Michael L. Gellner
Assistant Examiner—Daniel P. Malley
Attorney, Agent, or Firm—Wenderoth, Lind & Ponack

[57] ABSTRACT

An exposure device suctions photosensitive materials of different widths on an exposure table. A suction belt, driven by a motor, is uniformly formed with a plurality of suction holes. On the back of the suction belt is mounted a suction box with a belt support plate which is also formed with a plurality of suction holes. A pair of adjusting plates are attached to the belt support plate on its back side. By adjusting the position of the adjusting plates in a width direction, the suction holes in the outermost rows at both sides can be opened and closed. Thus, the suction width for the suction belt can be adjusted according to the width of the photosensitive material.

7 Claims, 5 Drawing Sheets

EXPOSURE DEVICE

BACKGROUND OF THE INVENTION

This invention relates to an exposure device used to print/expose a negative image on a negative film on a photosensitive material.

As an exposure device, the one shown in FIG. 5 is known. In this exposure device, a photosensitive material P drawn from a roll R is cut to a predetermined size by a cutter device 30. The photosensitive material P1, which is now cut off, is supported on an exposure table 20. A negative film F is illuminated by a light source 21 to print/expose the negative image thereon on the photosensitive material P1 through a printing lens 22.

As shown in FIG. 6, the exposure table 20 in the exposure device comprises a motor 23, an endless suction belt 24 driven by the motor 23 and formed with a plurality of suction holes 25, a suction box 26 having a support plate 27 formed with a plurality of suction holes 28, which are communicable with the suction holes 25 of the suction belt 24, and a blower 29 for suctioning the interior of the suction box 26. The photosensitive material P1 is suctioned and kept in its position by a suction force applied through the suction holes 28 and the suction holes 25 until it is fed to the exposure stage to be printed and exposed.

Furthermore, the photosensitive material P1, after being printed and exposed, is fed from the exposure table 20 to a developing unit (not shown) by the movement of the suction belt 24.

In such a conventional exposure device, the suction force is applied through all of the suction holes 25 of the suction belt face 24a regardless of the width of the photosensitive material P1. If it has a small width, so many suction holes 25 are open that air is also sucked into the suction box 26 through the suction holes 25.

Thus, the suction force per unit surface area of the photosensitive material P1 becomes so weak that the material is not suctioned enough and becomes adrift. This will cause a fuzziness problem.

If the suction force is set based on the smallest width of the photosensitive material P1 to in order to solve this problem, it is necessary to provide a blower 29 of an extremely large capacity, resulting in the problem of noise. Moreover, the suction belt 24 then has a larger transfer resistance, which will increase the size of the motor 23 as well as the cost.

SUMMARY OF THE INVENTION

It is an object to provide an exposure device which obviates the aforementioned problems and which makes it possible to reduce the size of the blower and the motor.

According to the present invention, there is provided an exposure device having a suction belt formed with a plurality of suction holes, an exposure table comprising a belt support plate for supporting the suction belt at its carrier side, and a suction box, the belt support plate being formed with a plurality of suction holes for imparting a suction force, and characterized in that an adjusting means for adjusting the suction width of the suction belt at the carrier side is further provided.

In the exposure device according to the present invention, since the suction width of the suction belt is adjustable according to the width of the photosensitive material, the photosensitive material can be suctioned and fed in the adjusted state.

Thus, even if the suction force is set based on the photosensitive material having the largest possible width, the photosensitive material of the smallest width can be reliably suctioned. In other words, a photosensitive material of any kind can be stably suctioned.

Moreover, since the suction force can be set based on the photosensitive material having the largest width, a blower and a motor of a small size may be used for feeding the suction belt.

BRIEF DESCRIPTION OF THE DRAWINGS

Other features and objects of the present invention will become apparent from the following description made with reference to the accompanying drawings, in which.

DETAILED DESCRIPTION OF THE DRAWINGS

Figure 1:
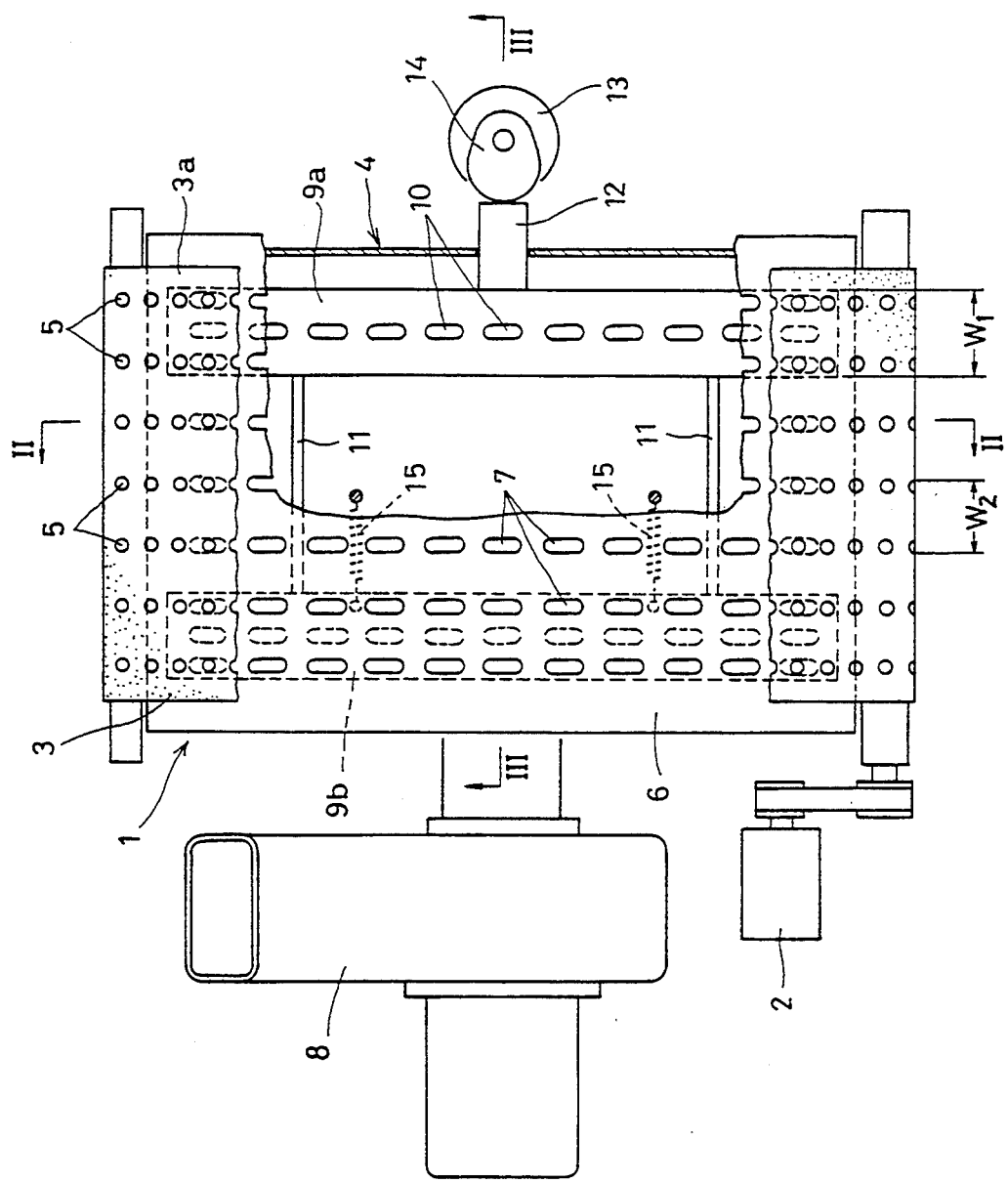
FIG. 1 is a partially cutaway plan view of one embodiment of the exposure table according to the present invention.
Figure 2:
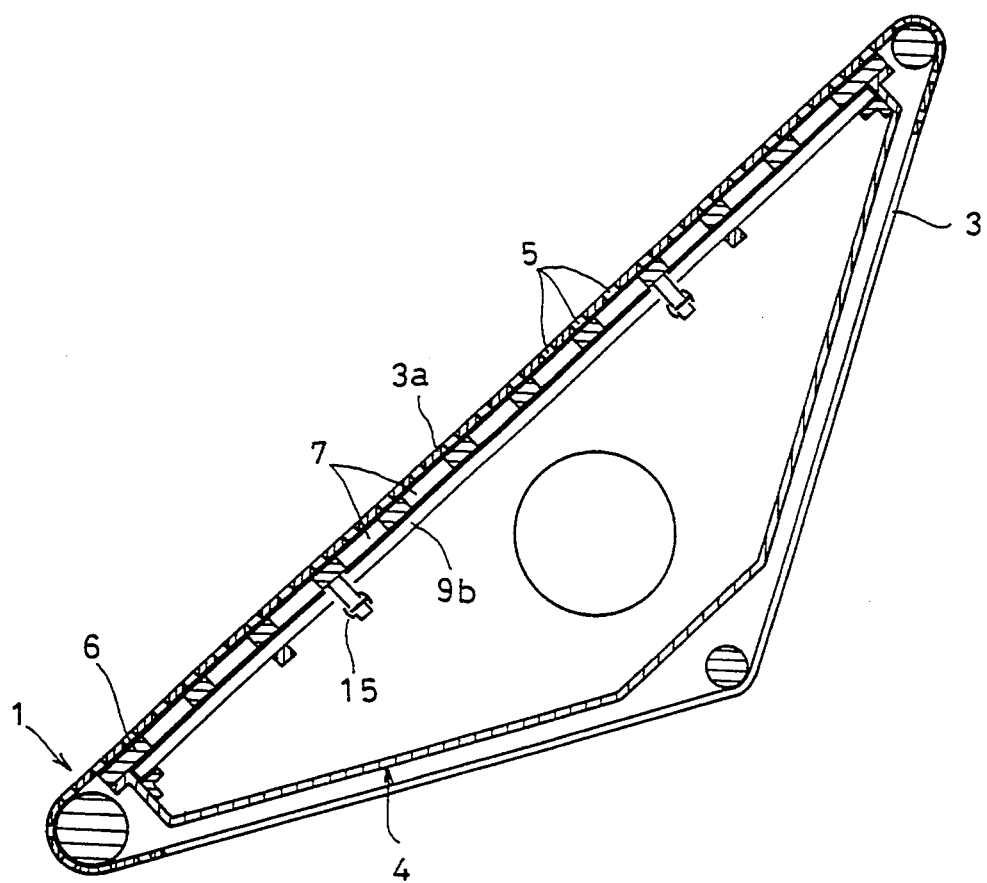
FIG. 2 is a sectional view taken along II—II of FIG. 1.

An exposure table 1 comprises an endless suction belt 3 driven by a motor 2, and a suction box 4 for supporting a suction belt 3a at its carrier side.

The suction belt 3 is formed with a plurality of suction holes 5 spaced apart at predetermined intervals with respect to one another in their feed direction. They are provided in a plurality of rows in a width direction of the suction belt 3. In the embodiment, the suction holes 5 are provided in seven rows.

The suction box 4 has a belt support plate 6 for supporting the suction belt 3a at the carrier side. The belt support plate 6 is formed with a plurality of suction holes 7 spaced apart at predetermined intervals with respect to one another in a feed direction. They are provided in a plurality of rows in a width direction of the suction belt 3. The interval between the rows of the suction holes 7 in the belt support plate 6 is the same as that of the suction holes 5 in the suction belt 3 so that the rows of the suction holes 5 and 7 are aligned with each other.

Further, the suction holes 7 are elongated in a feed direction of the suction belt 3. Thus, even while the suction belt 3 is being fed, any of the plurality of suction holes 5 formed in the suction belt 3 will communicate with one of the suction holes 7.

A blower 8 is connected to the suction box 4 to suction the interior of the suction box 4.

A pair of adjusting plate 9a and 9b, in the form of strips, are attached to both sides of the belt support plate 6 from its back side. Their width W1 is larger than the interval W2 between the adjacent rows of the suction holes 7.

At the center of the adjusting plates 9a and 9b are formed a plurality of elongated holes 10 spaced apart at predetermined intervals with respect to one another in their longitudinal direction. By moving the adjusting plates 9a and 9b in the width direction, the elongated holes 10 will be aligned with the suction holes 7.

The adjusting plates 9a and 9b are coupled to each other by a link 11. To the adjusting plate 9a is mounted a contact element 12 which slidably extends through a side plate of the suction box 4 and is kept into contact with a cam 14 driven by a motor 13.

Springs 15 are coupled to the other adjusting plate 9b. The contact element 12 is urged against the cam 14 by the bias of the spring 15.

Figure 3:
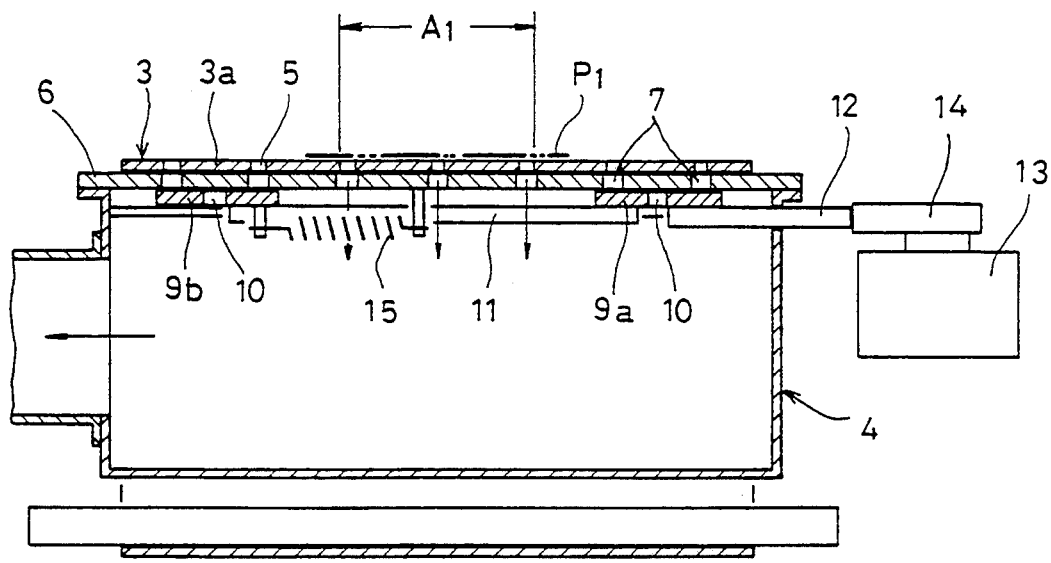
FIG. 3 is a sectional view taken along III—III of FIG. 1.

FIG. 3 shows a state in which the elongated holes 10 formed in the adjusting plates 9a and 9b and are not in alignment with the suction holes 7 in the belt support plate 6. In this state, the suction holes 7 in the outermost two rows on both sides are closed by the adjusting plates 9a and 9b.

Therefore, if the blower 8 is activated, the suction force will be applied to the suction holes 7 in the central three rows, and thus only to the suction holes 5 which communicate with these suction holes 7. A1 in FIG. 3 shows the suction width when the adjusting plates 9a and 9b close the suction holes 7 in the outermost two rows at both sides.

Figure 4:
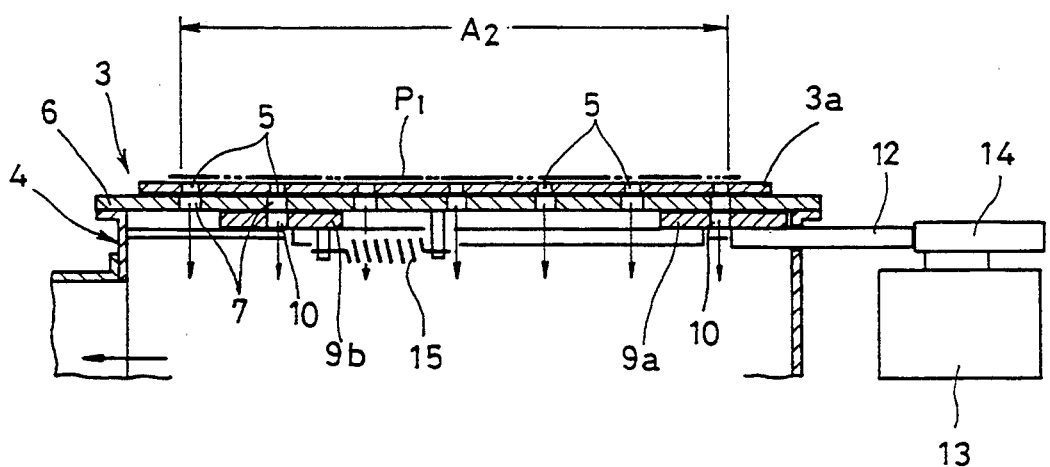
FIG. 4 is a sectional view showing how the suction width is adjusted.
Figure 5:
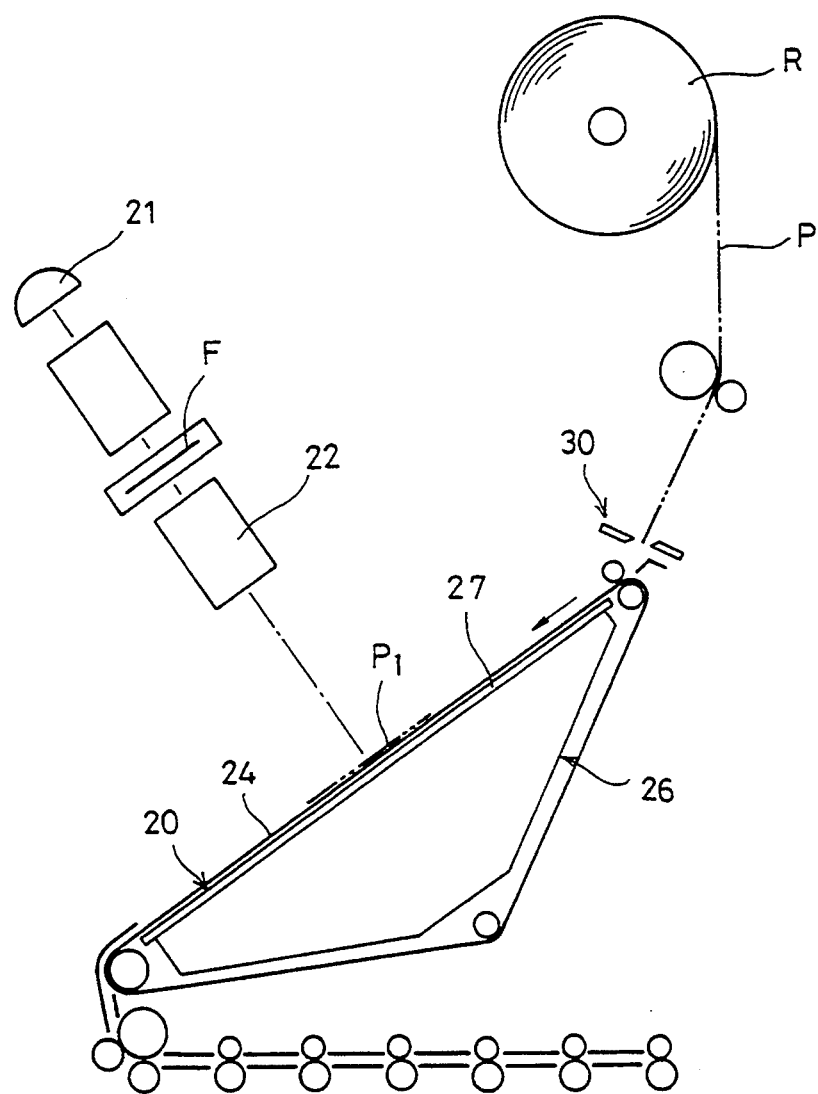
FIG. 5 is a schematic view of an exposure device.
Figure 6:
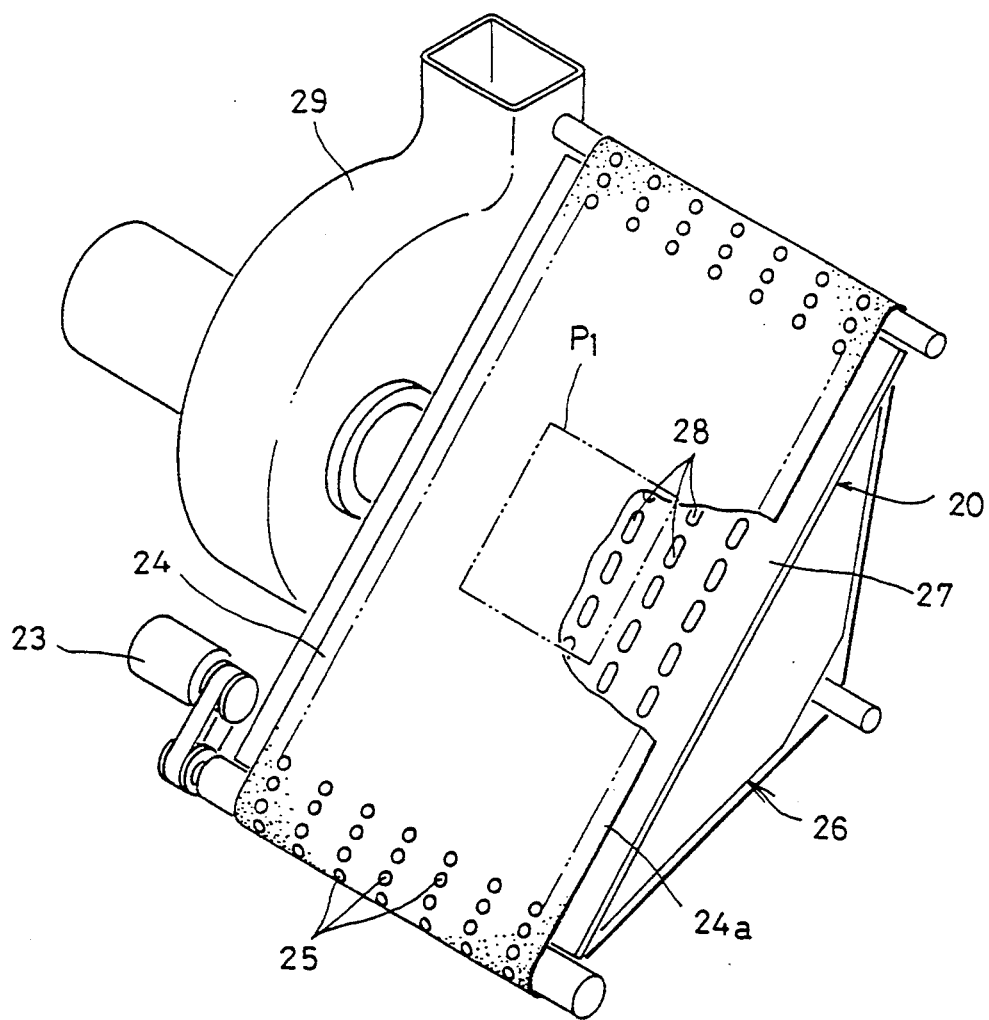
FIG. 6 is a partially cutaway perspective view of a prior art exposure table.

From this state shown in FIG. 3, the cam 14 is driven by the motor 13 to move the adjusting plates 9a and 9b in a width direction of the belt support plate 6. The motor 13 is stopped as soon as the elongated holes 10 of the adjusting plates 9a and 9b have come into alignment with the suction holes 7 of the belt support plate 6. As shown in FIG. 4, all the suction holes 7 are now open, so that the suction force is applied through the suction holes 5 communicating with the suction holes 7. A2 shows the suction width in this state.

By moving the adjusting plates 9a and 9b widthwise, the suction width acting on the suction belt 3a at the carrier side can be adjusted in two steps. Thus, by adjusting the suction width according to the width of the photosensitive material P1 fed by the suction belt 3, a photosensitive material P1 of different widths can be stably sucked.

What is claimed is:

1. An exposure device, comprising:
    a suction belt having a plurality of suction holes therein arranged in a plurality of rows that extend in a longitudinal direction of said suction belt;
    a suction box;
    an exposure table comprising a belt support plate connected with said suction box, said belt support plate having a front side for supporting said suction belt, a plurality of suction holes formed therein in a plurality of rows that extend in the longitudinal direction of said suction belt for communication with said suction holes of said suction belt, and a back side; and
    an adjusting plate movably mounted on said back side of said belt support plate so as to be movable between a closed position in which some of said suction holes of said belt support plate are closed and an open position in which said suction holes of said belt support plate that are closed in said closed position are open.

2. The exposure device of claim 1, and further comprising a moving means for moving said adjusting plate between said open and closed positions in a width direction of said belt support plate, the width direction being perpendicular to the longitudinal direction.

3. The exposure device of claim 2, wherein said moving means comprises a contact element connected with said adjusting plate, a cam, a motor for driving said cam and a spring biasing said contact element against said cam.

4. The exposure device of claim 3, and further comprising a second adjusting plate connected with the first said adjusting plate, both said adjusting plates extending in said longitudinal direction and being separated by a plurality of rows of said suction holes in said belt support plate.

5. The exposure device of claim 1, wherein said adjusting plate comprises a plurality of holes therein that are aligned with said suction holes of said belt support plate in said open position and are misaligned with said suction holes of said belt support plate in said closed position.

6. The exposure device of claim 5, wherein said adjusting plate is wider in a direction perpendicular to said longitudinal direction that the distance in the direction perpendicular to said longitudinal direction between two rows of said plurality of suction holes in said belt support plate.

7. The exposure device of claim 1, and further comprising a blower connected with said suction box for evacuating said suction box.

* * * * *